Figure 1:
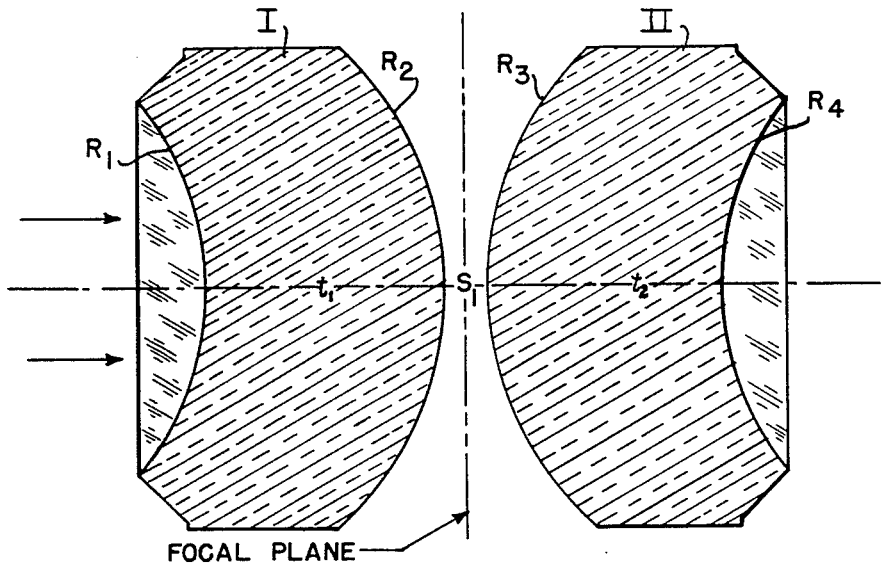

Dec. 26, 1961  F. E. ALTMAN  3,014,407
FIELD LENSES FOR TELESCOPES
Filed May 29, 1959  2 Sheets-Sheet 1

TABLE I

| FIELD LENS ASSEMBLY EF=282.60mm Ptz=-.0006 | | | | |
|---|---|---|---|---|
| LENS | $N_D$ | V | RADII | THICKNESSES |
| I | 1.517 | 64.5 | $R_1 = -57.43$ | $t_1 = 47.87$ |
|  |  |  | $R_2 = -63.90$ | $\frac{1}{2} S_1 = 5.99$ |
| II |  | SYMMETRICAL | | |

*INVENTOR.*
FRED E. ALTMAN
BY Wade Loontz
Arsen Tashjian
ATTORNEYS

TABLE 2

| FIELD LENS ASSEMBLY EF=156.13mm Ptz=+.000015 | | | | |
|---|---|---|---|---|
| LENS | $N_D$ | V | RADII | THICKNESSES |
| I | 1.5170 | 64.5 | $R_1$ = -57.43 | $t_1$ = 22.3 |
| | | | $R_2$ = PLANO | $t_2$ = 22.0 |
| II | 1.5230 | 58.6 | $R_3$ = ASPHERIC | ½ $S_1$ = 5.99 |
| III & IV | SYMMETRICAL | | | |
| * $R_3$ = -64.11 AT HEIGHT OF 45 mm | | | | |

*INVENTOR.*
FRED E. ALTMAN
BY
ATTORNEYS

United States Patent Office 3,014,407
Patented Dec. 26, 1961

3,014,407
FIELD LENSES FOR TELESCOPES
Fred E. Altman, Rochester, N.Y., assignor, by mesne assignments, to the United States of America as represented by the Secretary of the Air Force
Filed May 29, 1959, Ser. No. 817,012
2 Claims. (Cl. 88—57)

This invention relates to the use of thick meniscus field lenses in telescopes and more particularly is concerned with providing a novel field lens having two elements which are useful to correct for astigmatism and vastly improve the overall quality of the telescope while being satisfactorily shaped by the so-called sinking or dropping method.

In order to keep the diameter of the eye lens of a telescope down to a reasonable size and yet intercept those rays forming images of the outer portions of the field of view, it is desirable to include a field lens forward of the eye lens in the ocular. In telescopes used as sighting devices for covering wide fields of view, it is especially desirable for the observer to see the final image as a flat field free of astigmatism and coma while still having excellent central definition.

Accordingly, it is an object of the present invention to provide a field lens which includes aspheric surfaces so that perfect stop imagery is obtained for all principal rays from the axis to the most extreme point in the field.

Another object of the invention is to provide field lenses which can be used at the focal plane between the two erector systems which are required when the sighting telescope is equipped with scanning prisms that completely invert the image. The image as formed by the objective in this type of telescope in erect, and two inversions are required to present an erect image to the eyepiece.

A further object of the invention is to provide field lenses which enormously improve the overall quality of the telescope without requiring optical precision greater than for normal field lenses which can be made simply by the dropping method.

A still further object of the invention is to provide field lenses which are placed on each side of the intermediate focal plane of the telescope with their collective surfaces facing each other, thereby avoiding any loss of field correction gained by the use of a specially matched objective, eyepiece, and erector system.

Figure 2:
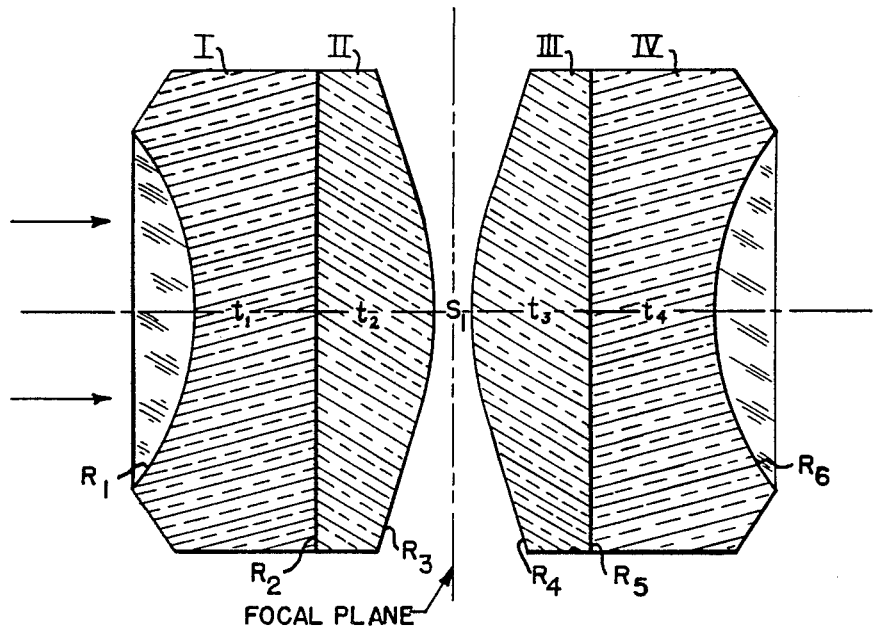

These and other objects, features and advantages will become more apparent from the following description taken in connection with the accompanying drawings wherein:

FIG. 1 is a view in section of the meniscus field lenses;

Table 1 gives data corresponding to the lenses in FIG. 1;

FIG. 2 is a view in section of meniscus field lenses having aspheric collective surfaces; and Table 2 gives data corresponding to the lenses in FIG. 2.

Symbols in the field in which this invention occurs are well established and Roman numerals I, II, etc. beginning with oncoming light indicate lens elements. Arrows indicate light energy paths. Lens surface radii of curvature are indicated by the letter R. Lens radii of curvature are positive for lens surfaces which are convex to oncoming light and are negative for lens surfaces which are concave to oncoming light. The letter $t$ indicates the axial thicknesses of lenses. The letter S indicates the axial air spaces between lens element surfaces. The symbol $N_D$ represents the refractive index for the sodium light D line of the spectrum having a wavelength of 5893 A. The symbol V represents the reciprocal of the Abbe dispersion value or is the constringence. The lens system described herein may be constructed from commercially available glass types.

Referring to FIG. 1 there is shown a sectional view of a field lens assembly which includes two meniscus lenses with their convex surfaces facing each other. Such a field lens is particularly useful for a telescope having two erectors and such radii that, for the extreme pencil, a proper coordination of the stops in the two telescopic erector systems, is necessary. The placing of two symmetrical lenses near the image allows each to have a neutralizing effect on the other as far as magnifying the image is concerned.

Spherical aberration in this field lens (FIG. 1), as far as the stops are concerned, causes intermediate principal rays to be less convergent than desired and, in some cases, to be actually divergent, thus introducing excessive vignetting of the stop. This vignetting is manifest, on looking through the telescope, by the presence of "lima beans" which are areas of field of that general shape that are completely vignetted. Areas immediately surrounding these "lima beans" are completely visible without shifting the eye position.

In order to correct the vignetting condition, it is necessary to correct the spherical aberration of the principal rays by means of aspheric collective surfaces so that perfect stop imagery is obtained for all principal rays from the axis to that for the most extreme point in the field.

In FIG. 2, there is shown a sectional view of a comparable field lens assembly which includes two thick meniscus lenses having aspheric collecting surfaces. When a field lens having these aspheric surfaces is used, the unpleasant vignetting in the exit pupil is completely corrected with only a slight change in field curvature. It is apparent from the field corrections that follow, that such aspheric field lenses are an improvement over former field lenses in which no effort was made to accomplish field correction and perfect stop imagery.

The following chart gives actual tabulated values for aspherical surface curvatures of the field lenses shown in FIGURE 2.

| Y (inches) | X Aspheric | X Sphere | Diff (inches) |
|---|---|---|---|
| .0000 | .0000 | .0000 | .0000 |
| .1000 | .0006 | .0006 | .0000 |
| .2000 | .0088 | .0088 | .0000 |
| .3000 | .0199 | .0199 | .0000 |
| .4000 | .0354 | .0355 | .0001 |
| .5000 | .0554 | .0557 | .0003 |
| .6000 | .0800 | .0806 | .0006 |
| .7000 | .1093 | .1105 | .0012 |
| .8000 | .1434 | .1455 | .0021 |
| .9000 | .1825 | .1858 | .0033 |
| 1.0000 | .2266 | .2319 | .0053 |
| 1.1000 | .2761 | .2840 | .0079 |
| 1.2000 | .3312 | .3427 | .0115 |
| 1.3000 | .3922 | .4086 | .0164 |
| 1.4000 | .4593 | .4825 | .0232 |
| 1.5000 | .5330 | .5654 | .0324 |
| 1.6000 | .6139 | .6587 | .0448 |
| 1.7000 | .7024 | .7645 | .0621 |
| 1.8000 | .7991 | .8854 | .0863 |
| 1.9000 | .9047 | 1.0258 | .1211 |
| 2.0000 | 1.0201 | 1.1936 | .1735 |

The calculations are based on an index of refraction of $N_D = 1.523$ (C–1 glass) for the aspheric portion of the field lens.

The equation of the aspheric surface in inches is $$X = .220275y^2 + .0059113507y^4 + .0007091y^6$$

A pair of simple lenses that would coordinate the stops in the two erectors of a sighting telescope may have a focal length for the combination of 156 mm. and a Petzval contribution of $+.0042$. The Petzval contribution of the field lenses described above with aspheric surfaces is practically zero.

Where every possible gain in field flattening is to be obtained, the thick meniscus field lens with aspheric surfaces has definite advantages over field lenses of simpler structure. In the embodiment described in this application, two identical field lenses are placed at equal distances from an intermediate focal plane. No magnification change is produced in image size by their use, and no transverse errors of distortion, lateral color, or coma are normally encountered. Because of these advantageous characteristics, and to make the aspheric surface common in the two lenses, symmetry is maintained in the field lenses even though in certain applications the conjugates may be unsymmetrical.

It will be apparent to those skilled in the art that various changes may be made in the illustrative embodiments without departing from the general principles and scope of the invention. For example, the field lens could be modified to introduce a specific spherical aberration, if such a condition was desirable under the circumstances.

Having thus described my invention, what I claim as new and desire to secure by Letters Patent of the United States is:

1. A telescopic field lens system comprising a plurality of axially aligned components having numerical data substantially as follows:

[E.F.=282.60 mm. Ptz=−.0006]

| Lens | $N_D$ | V | Radii | Thicknesses |
|---|---|---|---|---|
| I | 1.5170 | 64.5 | $R_1=-57.43$ $R_2=-63.90$ | $t_1=47.87$ ½ $S_1=5.99$ ½ $S_1=5.99$ |
| II | 1.5170 | 64.5 | $R_3=63.90$ $R_4=57.43$ | $t_2=47.87$ | in which $R_1$, $R_2$ indicate the radii of the individual surfaces starting from the front, $t_1$ indicates the actual thickness of the elements, and $S_1$ indicates the axial length of the air space between the components.

2. A telescopic field lens system comprising a plurality of axially aligned components having numerical data substantially as follows:

[E.F.=156.13 mm. Ptz=+.00015]

| Lens | $N_D$ | V | Radii | Thicknesses |
|---|---|---|---|---|
| I | 1.5170 | 64.5 | $R_1=-57.43$ | $t_1=24.3$ |
| II | 1.5230 | 58.6 | $R_2$=plano $R_3$=aspheric | $t_2=22.0$ ½$S_1=5.99$ ½$S_1=5.99$ |
| III | 1.5230 | 58.6 | $R_4$=aspheric $R_5$=plano | $t_3=22.0$ |
| IV | 1.5170 | 64.5 | $R_6=57.43$ | $t_4=24.3$ | in which $R_1$, $R_2$ . . . indicate the radii of the individual surfaces starting from the front, $t_1$, $t_2$ indicate the actual thickness of the individual elements, and $S_1$ indicates the axial length of the air space between the components.

References Cited in the file of this patent
UNITED STATES PATENTS

| | | |
|---|---|---|
| 1,468,762 | Taylor et al. | Sept. 25, 1923 |
| 1,968,222 | Richter | July 31, 1934 |
| 2,063,178 | Merte | Dec. 8, 1936 |
| 2,430,549 | Altman | Nov. 11, 1947 |
| 2,730,925 | Kavanagh | Jan. 17, 1956 |

FOREIGN PATENTS

| | | |
|---|---|---|
| 593,362 | Great Britain | Oct. 15, 1947 |